Figure 1:
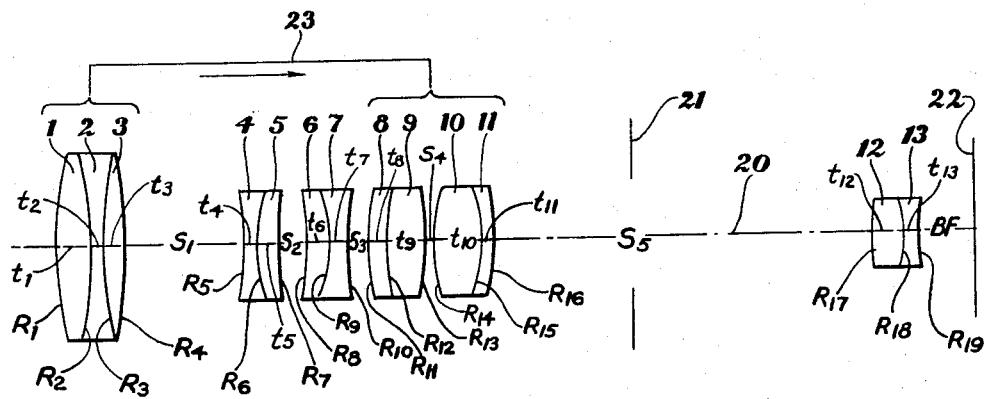

July 15, 1958  M. REISS  2,843,016
OPTICAL ZOOM SYSTEM
Filed March 4, 1957  2 Sheets-Sheet 1

Max Reiss
INVENTOR.
BY Daniel I. Mayne
Harold F. Bennett
ATTORNEY & AGENT

Fig. 2

| LENS | N | V | RADII | THICKNESSES |
|---|---|---|---|---|
| | EF = 610 mm to 203 mm. | | | f/4.5 |
| 1 | 1.5110 | 63.5 | $R_1 = +276.9$ mm. | $t_1 = 18.0$ mm. |
| 2 | 1.6490 | 33.8 | $R_2 = -397.8$ | $t_2 = 8.8$ |
| 3 | 1.6384 | 55.5 | $R_3 = +648.1$ | $t_3 = 8.6$ |
| | | | $R_4 = -892.7$ | $S_1 = 148.2$ to $25.0$ |
| 4 | 1.5725 | 57.4 | $R_5 = -309.0$ | $t_4 = 7.3$ |
| 5 | 1.7200 | 29.3 | $R_6 = +111.2$ | $t_5 = 10.9$ |
| | | | $R_7 = +231.6$ | $S_2 = 11.5$ |
| 6 | 1.6490 | 33.8 | $R_8 = -200.4$ | $t_6 = 10.9$ |
| 7 | 1.5880 | 61.2 | $R_9 = -86.36$ | $t_7 = 7.3$ |
| | | | $R_{10} = +506.2$ | $S_3 = 10.1$ to $133.3$ |
| 8 | 1.6490 | 33.8 | $R_{11} = +589.0$ | $t_8 = 8.5$ |
| 9 | 1.6160 | 49.5 | $R_{12} = +124.6$ | $t_9 = 22.2$ |
| | | | $R_{13} = -321.7$ | $S_4 = 0.7$ |
| 10 | 1.6110 | 58.8 | $R_{14} = +315.6$ | $t_{10} = 22.2$ |
| 11 | 1.6490 | 33.8 | $R_{15} = -110.6$ | $t_{11} = 8.5$ |
| | | | $R_{16} = -553.3$ | $S_5 = 413.1$ to $290.0$ |
| 12 | 1.6110 | 58.8 | $R_{17} = +121.7$ | $t_{12} = 31.2$ |
| 13 | 1.6160 | 49.5 | $R_{18} = -211.3$ | $t_{13} = 5.0$ |
| | | | $R_{19} = +121.7$ | $BF = 36.1$ |

Max Reiss
INVENTOR.

United States Patent Office 2,843,016
Patented July 15, 1958

2,843,016

OPTICAL ZOOM SYSTEM

Max Reiss, Rochester, N. Y., assignor to Eastman Kodak Company, Rochester, N. Y., a corporation of New Jersey Application March 4, 1957, Serial No. 643,864

4 Claims. (Cl. 88—57)

This invention relates to optical systems with variable focal lengths variously known as panchratic, varifocal or zoom systems.

Zoom lens systems have been known for many years. They are of various degrees of complexity ranging from those made up of a positive member and a second member of either sign movable relative thereto up to systems having five components (e. g. Br. 750,550 Reymond). From a practical point of view, zoom systems are generally classified as zoom attachments, which are afocal systems for attachment to the front of an objective, or as zoom systems proper. The theory of zoom systems from the standpoint of Gaussian optics is the same for both types, the objective and attachment being considered together as one complete system. This theory has been well worked out, and it is known that when there is only one movable member then the system is sharply in focus for two distinct magnifications at the most. This assumes that the focal plane is fixed, for if the focal plane is movable then that qualifies as a second movable member so far as interpretation of this rule is concerned. If two members are moved by a cam arrangement, then the system can theoretically be kept in focus at all magnifications throughout the range, but if the movements of the two movable members are linearly related (which is much less expensive to manufacture), for example if they are moved by means of screw threads, either identical or with different pitch, by equal amounts of rotation of the two screw threads relative to the fixed mating thread then there are at most three different magnifications at which the system is accurately focused. See for example a paper by F. G. Back in the Journal of the Optical Society of America, December 1953, pages 1195–1199. In general, the designer has to consider the range of magnifications to be covered and the tolerable depth of focus and determine from the Gaussian or Newtonian equations whether or not two members moved linearly will maintain the focal position within tolerances throughout the zooming range. If not, he must provide a more complex system either by providing three linearly movable members or two non-linearly movable members.

It is known to locate the diaphragm behind the movable members so that the relative aperture remains constant. In regard to the correction of aberrations, it has generally been felt that at best only a compromise is possible, that is to say if each member is corrected in itself for color, and if the monochromatic aberrations are corrected for the middle of the zooming range, then the residual aberrations vary in one direction toward one end of the zooming range and in the other direction toward the other end, and the best compromise was supposed to have been reached.

According to the present invention, a zoom system is made up in which the primary and secondary curvature of field and the lateral color remain as closely as possible at constant values during the zooming range regardless of whether these constant values represent tolerable residuals or not, and then a fixed rear component is added near the focal plane for correcting the residuals of these aberrations. I have discovered that these aberrations tend to pass through a stationary value (a generic term for maximum and minimum) during zooming, and that the structure of the members of the zoom system can be made such that stationary values for both aberrations occur near the middle of the useful zooming range. I have found the field curvatures to be the worst offenders in zoom systems in degrading the image during zooming. Lateral color is comparatively easy to correct along with the field curvatures by a "buried surface" in the field flattening member. A "buried surface" is commonly understood to mean a cemented surface at which there is a substantial difference of dispersive index but a very small difference of refractive index. However, I am not restricted to buried surfaces, as an index difference sometimes is valuable in correcting monochromatic aberrations.

Spherical aberration likewise tends to go through a stationary value during zooming, and I consider it within the scope of my invention to correct the spherical aberration of the zoom system proper to a residual value greater than acceptable but so that the variation is very small and to correct the approximately constant residual by a fixed correcting member near the diaphragm. However, the specific systems I have made up thus far have been well within tolerance as to spherical aberration without any auxiliary correcting member. In special cases the residual field curvatures and the residual spherical aberration can all be corrected by one auxiliary member roughly midway between the diaphragm and the focal plane.

In regard to coma, distortion and axial color, I found the variation to be more nearly linear and to be small enough so that it is within tolerances. Distortion, in particular, has no harmful effect on the sharpness of the image even though it may be annoying.

I prefer to embody my invention in a system comprising a front movable positive member, a fixed negative member and a second movable positive member all axially aligned with each other and in front of an aperture stop or diaphragm, and a corrective member of very low power behind the aperture stop and axially aligned with the rest of the system, the two movable positive members being fixed relative to each other and both movable the same distance.

In a specific embodiment designed for a zooming range from 200 to 610 mm. (8 to 24 inches) I found the following construction to give very satisfactory results: The front movable positive member is a cemented triplet consisting of the usual front low-index positive element and a negative element cemented therebehind differing by between 0.1 and 0.25 in refractive index and a second positive element cemented thereto by a so-called buried surface, the index of the third element being within 0.025 of that of the second element. The fixed negative member consists of two biconcave negative cemented doublets, each doublet being made up of a biconcave negative element of low-dispersion glass having a refractive index between 1.5 and 1.62 and a positive element of a high-dispersion glass having a refractive index between 0.05 and 0.25 higher than that of the biconcave element. The second movable positive member consists of two cemented biconvex positive achromatic doublets, each doublet consisting of a biconvex element of low-dispersion glass having a refractive index between 1.55 and 1.65 and a negative element cemented thereto having a refractive index greater than that of the positive element by between 0.02 and 0.08, the negative element having a lower dispersive index. The correcting member behind the diaphragm in this form of the invention preferably consists of a strongly meniscus doublet convex to the front and having a focal length greater than the focal length of the system at the long focal length end of the zooming range. This meniscus doublet has a cemented surface concave toward the front which is useful in providing a final adjustment for the Petzval sum of the system by a choice of the relative refractive indices of the two elements and in controlling the lateral color of the system by the choice of dispersive indices of the two elements of this meniscus doublet.

I contemplate using a somewhat simpler construction when making the system up for use at shorter focal lengths, for example by using a doublet and a singlet or only a doublet in either the fixed negative member or the second movable positive member or both.

In the accompanying drawing:

Fig. 1 shows in diagrammatic axial section a zoom system according to the invention adjusted for long focal length.

Fig. 2 gives constructional data for one specific embodiment of the invention.

Figure 3:
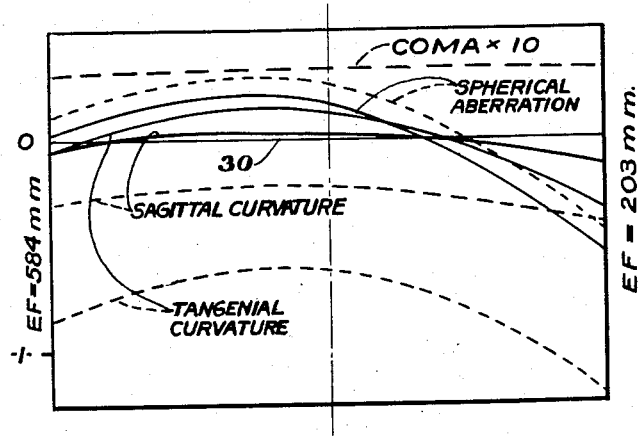

Fig. 3 is a graph showing the aberrations of the zoom system without and with the corrective member.

In Fig. 1 the front movable positive member is the cemented triplet made up of elements 1, 2 and 3; the fixed negative member comprises the two biconcave doublets made up of elements 4 to 7, the second movable positive member consists of the two doublets made up of elements 8 to 11 and the correcting component consists of elements 12 and 13. The aperture stop or diaphragm 21 is between the second movable positive member and the correcting member and all are aligned on the axis 20 and form an image of distant objects in the focal plane 22. The two movable positive members are joined to each other as shown schematically by the line 23 and move equal amounts during zooming.

Focusing for different object distances may optionally be accomplished by providing an adjustable focusing auxiliary lens in known manner as shown in 2,718,817, Back and Lowen, and for an analogous purpose in 2,048,-284, Newcomer, but I find the simpler system of focusing by moving the front component as in 2,165,341, Capstaff et al., to be quite satisfactory for distances down to 25 times the focal length and probably for shorter distances as well.

Fig. 2 is a table giving constructional data for a specific embodiment of my invention. This table is repeated below for convenience:

[EF = 610 mm. to 203 mm.   $f/4.5$.]

| Lens | N | V | Radii, mm. | Thicknesses, mm. |
|------|------|------|------------|------------------|
| 1 | 1.5110 | 63.5 | $R_1 = +276.9$ | $t_1 = 18.0$ |
|   |        |      | $R_2 = -397.8$ |              |
| 2 | 1.6490 | 33.8 |                | $t_2 = 8.8$ |
|   |        |      | $R_3 = +648.1$ |              |
| 3 | 1.6384 | 55.5 |                | $t_3 = 8.6$ |
|   |        |      | $R_4 = -892.7$ |              |
|   |        |      |                | $s_1 = 148.2$ to 25.0 |
|   |        |      | $R_5 = -309.0$ |              |
| 4 | 1.5725 | 57.4 |                | $t_4 = 7.3$ |
|   |        |      | $R_6 = +111.2$ |              |
| 5 | 1.7200 | 29.3 |                | $t_5 = 10.9$ |
|   |        |      | $R_7 = +231.6$ |              |
|   |        |      |                | $s_2 = 11.5$ |
|   |        |      | $R_8 = -200.4$ |              |
| 6 | 1.6490 | 33.8 |                | $t_6 = 10.9$ |
|   |        |      | $R_9 = -86.36$ |              |
| 7 | 1.5880 | 61.2 |                | $t_7 = 7.3$ |
|   |        |      | $R_{10} = +506.2$ |           |
|   |        |      |                | $s_3 = 10.1$ to 133.3 |
|   |        |      | $R_{11} = +589.0$ |           |
| 8 | 1.6490 | 33.8 |                | $t_8 = 8.5$ |
|   |        |      | $R_{12} = +124.6$ |           |
| 9 | 1.6160 | 49.5 |                | $t_9 = 22.2$ |
|   |        |      | $R_{13} = -321.7$ |           |
|   |        |      |                | $s_4 = 0.7$ |
|   |        |      | $R_{14} = +315.6$ |           |
| 10 | 1.6110 | 58.8 |               | $t_{10} = 22.2$ |
|    |        |      | $R_{15} = -110.6$ |          |
| 11 | 1.6490 | 33.8 |               | $t_{11} = 8.5$ |
|    |        |      | $R_{16} = -553.3$ |          |
|    |        |      |                | $s_5 = 413.1$ to 290.0 |
|    |        |      | $R_{17} = +121.7$ |          |
| 12 | 1.6110 | 58.8 |               | $t_{12} = 31.2$ |
|    |        |      | $R_{18} = -211.3$ |          |
| 13 | 1.6160 | 49.5 |               | $t_{13} = 5.0$ |
|    |        |      | $R_{19} = +121.7$ |          |
|    |        |      |                | BF = 36.1 |

In this table, as in Fig. 2, the lens elements are numbered consecutively from front to rear in the first column, the refractive indices N for the D spectral line and the conventional dispersive indices V are given in the second and third columns, the radii of curvature R of the lens surfaces, the thicknesses $t$ of the lens elements and the air spaces $s$ are given in the fourth and fifth columns. The variable spaces, $s_1$, $s_3$ and $s_5$, are given first as adjusted for a 610 mm. focal length and then as adjusted for a 203 mm. focal length. These spaces have intermediate values for intermediate focal lengths, and for a focal length of 304 mm. they differ by 47.6 mm. from the value at 203 mm. The diaphragm remains fixed at 267 mm. in front of lens element 12, and by virtue of this fixed position of the diaphragm the aperture ratio or speed of the system remains constant during zooming.

For focusing, the front element is moved 9.41 mm. to the left for objects at 75 feet and 14.25 mm. to the left for objects at 50 feet.

The method of mounting the optical parts so that the two positive members are coupled together and slide as a unit is not within the scope of this invention. Methods of mounting systems of this type are known and any suitable known mounting means may be used.

Fig. 3 is a graph showing in dotted lines the aberrations of the system without the correcting member and in full lines the aberrations of the system with the correcting member, and the variations thereof throughout the zooming range. The respective pairs of curves as labelled have the same shape and are merely displaced upward or downward with respect to each other, showing the effect of the correcting member. The horizontal axis 30 represents zero values of the aberrations even though zero is not the best residual in every case. The spherical aberrations and coma shown are those for the marginal ray at $f/4.5$ computed trigonometrically. The coma is shown on a 10-times exaggerated scale. Even then the corrected coma curve is substantially indistinguishable from the zero axis line 30 and is not shown. The tangential and saggital curvatures of field are given for a point 20.2 mm. from the axis and as computed along the principal ray by Coddington's equations. The lateral color was computed for the same ray. The coma is given as the offense against sine condition and as above mentioned is exaggerated ten times. The distortion and axial color are within tolerances throughout the computed range and are not shown. It will be noted that the field curvatures are undercorrected before the light rays strike the correcting member, and the correcting member has been designed according to the invention to contribute over-correction or positive curvature of field to cancel that of the rest of the system. The lateral color is corrected by a choice of dispersive indices of the two elements making up the meniscus correcting member, and the Petzval sum is controlled to some extent by the choice of refractive indices thereof. By making the refractive index of the negative element low and that of the positive element high, the correcting member is made to contribute negative Petzval sum and by the reverse arrangement, it is made to contribute positive Petval sum in accordance with the well-known laws of optics. In the present instance, the Petzval sum of the system without the correcting member was within tolerances and accordingly I was able to take advantage of the convenience of a buried surface for correcting lateral color. It may happen that no correction of lateral color is needed, and in such a case the correcting member may be made up of a single meniscus element of one kind of glass. Likewise, the buried surface in the front positive member, that is, the cemented surface between element 2 and element 3 may be eliminated in special cases when the correction of monochromatic aberrations leads to a sufficiently strong curvature of surface $R_3$ to correct the color.

In the example shown, the equivalent focal length of the several components are as shown in the following table:

| Elements: | Combined focal length |
|---|---|
| 1, 2, 3 | +459.4 |
| 4, 5 | −273.7 |
| 6, 7 | −268.4 |
| 8, 9 | +366.3 |
| 10, 11 | +367.0 |
| 12, 13 | −2017.5 |

I consider variations of ±20% in the focal length of any of the front five components and variations of $0.2/f$ in shape thereof as measured by the curvature of the respective front surface to be within the category of minor variations of this example, $f$ being the focal length of the system at the long focal length end of the zooming range. The auxiliary component may be of either sign, and I consider any focal length greater than $f$ to be in the same category.

I claim:

1. An optical zoom system comprising a front movable positive member, a fixed negative member and a second movable positive member all in axial alignment with each other and in front of an aperture stop, and a weak corrective member axially aligned and at a fixed distance behind the aperture stop, the two movable positive members being adapted to remain at a fixed distance from each other and to move equal distances relative to the fixed members of the system for varying the focal length of the complete system from a value F when the movable members are at the forward end of the range of movement to a value between $2F/5$ and zero when the movable members are at the rearward end of the range of movement, in which the front movable positive member is a single compound biconvex component having a focal length of 0.74F ±20%, the fixed negative member consists of two compound biconcave components having focal lengths of −0.45F and −0.44F respectively, each ±20%, the rear movable positive member consists of two compound biconvex components each having a focal length of 0.60F ±20% and the corrective member is meniscus in outward form, convex to the front, and has a focal length between F and infinity.

2. An optical zoom system comprising a front movable positive member, a fixed negative member and a second movable positive member all in axial alignment with each other and in front of an aperture stop, and a weak corrective member axially aligned and at a fixed distance behind the aperture stop, the two movable positive members being adapted to remain at a fixed distance from each other and to move equal distances relative to the fixed members of the system for varying the focal length of the complete system from a value F when the movable members are at the forward end of the range of movement to a value between $2F/5$ and zero when the movable members are at the rearward end of the range of movement, in which the front movable positive member consists of a cemented triplet consisting of a front positive element, a negative element cemented therebehind having a refractive index between 0.1 and 0.25 greater than that of the front element, and a rear positive element whose refractive index differs by less than 0.025 from that of the second element, in which the fixed negative member consists of two biconcave negative cemented doublets, each doublet being made up of a biconcave negative element of low-dispersion glass having a refractive index between 1.50 and 1.62 and a positive element of a high-dispersion glass having a refractive index between 0.05 and 0.25 higher than that of the biconcave element cemented thereto, and in which the second movable positive member consists of two cemented biconvex positive achromatic doublets, each positive doublet consisting of a biconvex element of glass having a refractive index between 1.55 and 1.65 and a negative element cemented thereto having a refractive index greater than that of the positive element by between 0.02 and 0.08 and in which the correcting member behind the diaphragm consists of a meniscus doublet convex to the front and having a focal length between F and infinity and consisting of a front biconvex element and a rear biconcave element cemented thereto.

3. An optical zoom system according to claim 2 in which the front movable positive member has a focal length of 0.74F ±10%, the front doublet of the fixed negative member has a focal length of −0.45F ±10%, the rear doublet of the fixed negative member has a focal length of −0.44F ±10%, the front doublet of the rear movable positive member has a focal length 0.60F ±10% and the rear doublet of the rear movable positive member has a focal length between +0.60F ±10%.

4. An optical zoom system substantially according to the following specifications:

| Lens | N | V | Radii | Thicknesses |
|---|---|---|---|---|
| 1 | 1.51 | 64 | $R_1=+0.46\ F$ | $t_1=0.03\ F$ |
| 2 | 1.65 | 34 | $R_2=-0.65\ F$ | $t_2=0.01\ F$ |
| 3 | 1.64 | 56 | $R_3=+F$ | $t_3=0.01\ F$ |
|   |      |    | $R_4=+1.5\ F$ | $s_1=0.24\ F$ to $0.04\ F$ |
| 4 | 1.57 | 57 | $R_5=-0.51\ F$ | $t_4=0.01\ F$ |
| 5 | 1.72 | 29 | $R_6=+0.18\ F$ | $t_5=0.02\ F$ |
|   |      |    | $R_7=+0.38\ F$ | $s_2=0.02\ F$ |
| 6 | 1.65 | 34 | $R_8=-0.33\ F$ | $t_6=0.02\ F$ |
| 7 | 1.59 | 61 | $R_9=-0.14\ F$ | $t_7=0.01\ F$ |
|   |      |    | $R_{10}=+0.8\ F$ | $s_3=0.26\ F-s_1$ |
| 8 | 1.65 | 34 | $R_{11}=+1.0\ F$ | $t_8=0.01\ F$ |
| 9 | 1.62 | 50 | $R_{12}=+F/8$ | $t_9=0.04\ F$ |
|   |      |    | $R_{13}=-0.53\ F$ | $0.0<s_4<0.01\ F$ |
| 10 | 1.61 | 59 | $R_{14}=+0.52\ F$ | $t_{10}=0.04\ F$ |
| 11 | 1.65 | 34 | $R_{15}=-0.18\ F$ | $t_{11}=0.01\ F$ |
|   |      |    | $R_{16}=-0.9\ F$ | $s_5=0.43\ F+s_1$ |
| 12 | 1.61 | 59 | $R_{17}=+0.20\ F$ | $t_{12}=0.05\ F$ |
| 13 | 1.62 | 50 | $R_{18}=-F/3$ | $t_{13}=0.01\ F$ |
|   |      |    | $R_{19}=+0.20\ F$ |  | wherein the lens elements are numbered in order from front to rear in the first column of the table, the refractive index N for the D line of the spectrum and the conventional dispersive index V are given in the second and third columns of the table, and in which the radii of curvature R of the lens surfaces, the thicknesses $t$ of the lens elements and the spaces $s$ between lens components, each numbered by subscripts in order from front to rear are given in the last two columns of the table, in which + and − signs associated with the respective radii indicate surfaces respectively convex and concave to the front, and in which F is the focal length of the system at the long-focal-length end of the range of adjustment.

References Cited in the file of this patent

UNITED STATES PATENTS

| | | |
|---|---|---|
| 2,566,485 | Cuvillier | Sept. 4, 1951 |
| 2,704,487 | Rosier | Mar. 22, 1955 |
| 2,718,847 | Back et al. | Sept. 27, 1955 |
| 2,778,272 | Reymond | Jan. 22, 1957 |
| 2,782,684 | Hopkins | Feb. 26, 1957 |